Sept. 29, 1942.    V. SPEISER    2,297,259
HYDRODYNAMIC POWER TRANSMISSION
Filed Aug. 16, 1938    3 Sheets-Sheet 1
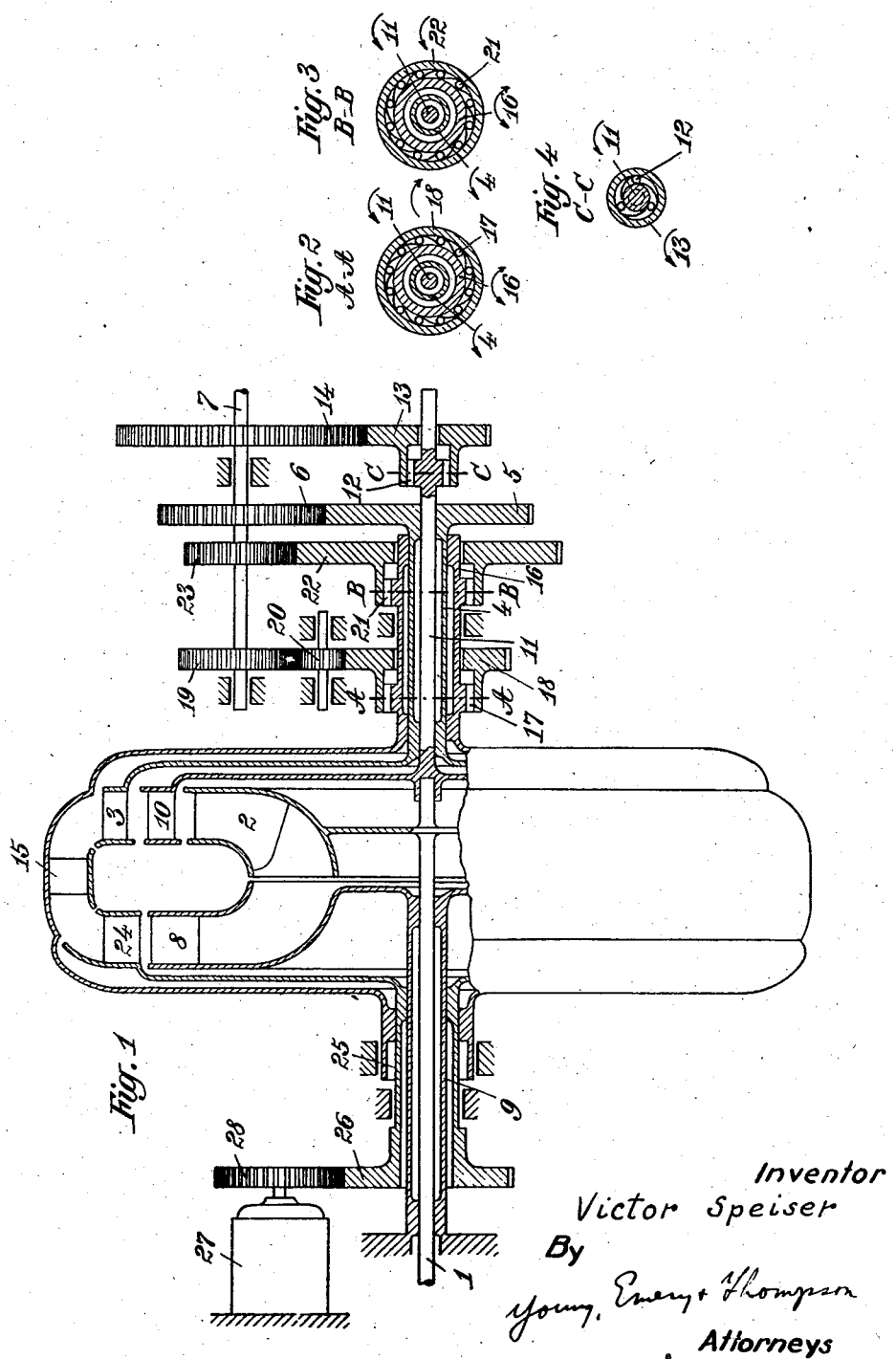
Inventor
Victor Speiser
By
Young, Emery + Thompson
Attorneys Sept. 29, 1942.  V. SPEISER  2,297,259
HYDRODYNAMIC POWER TRANSMISSION
Filed Aug. 16, 1938  3 Sheets-Sheet 2
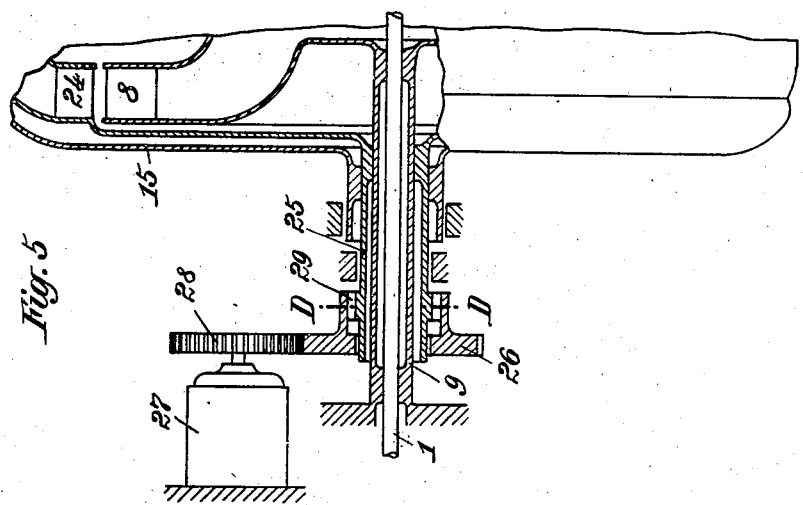
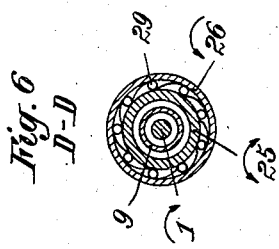
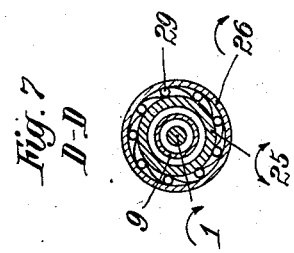
Inventor
Victor Speiser
By
Young, Emery + Thompson
Attorneys Sept. 29, 1942.  V. SPEISER  2,297,259
HYDRODYNAMIC POWER TRANSMISSION
Filed Aug. 16, 1938  3 Sheets-Sheet 3
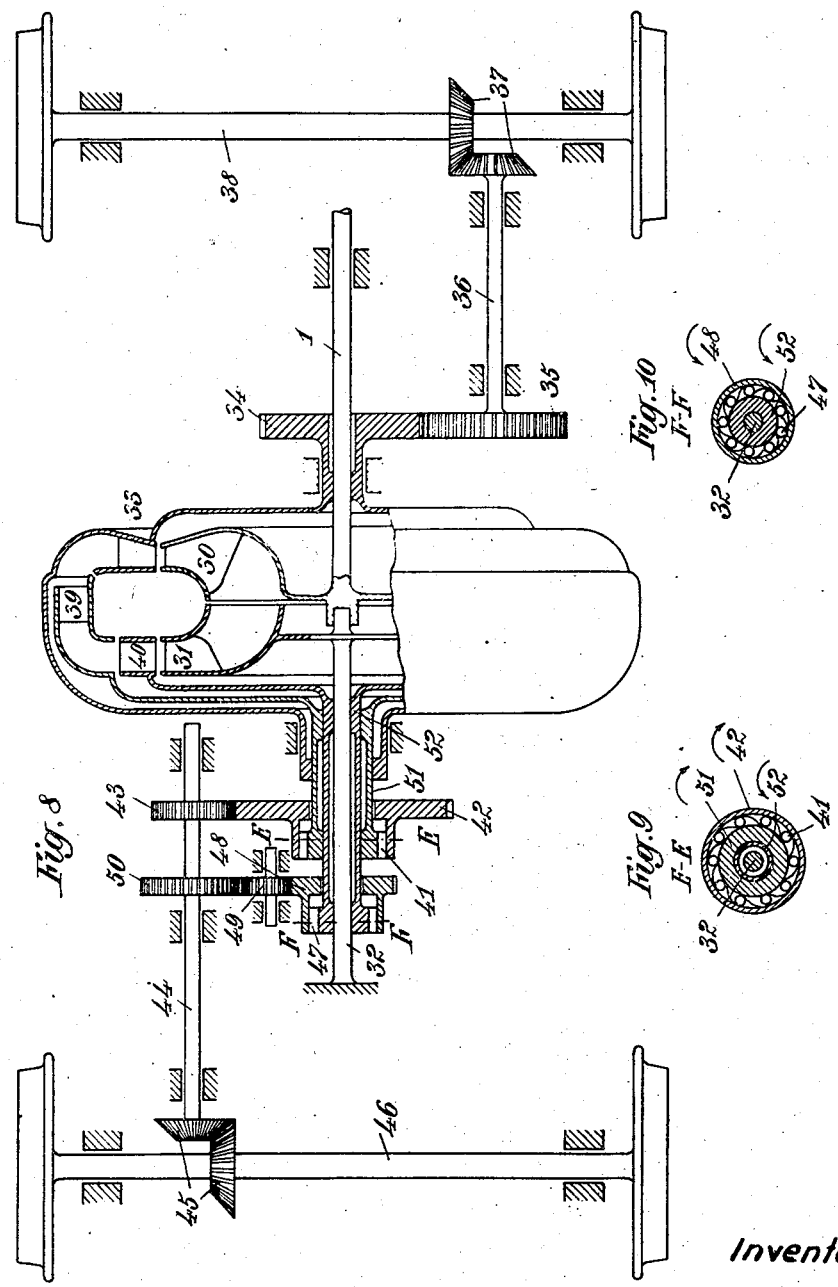
Inventor
Victor Speiser
By
Young, Emery & Thompson
Attorneys

UNITED STATES PATENT OFFICE 2,297,259

HYDRODYNAMIC POWER TRANSMISSION

Victor Speiser, Berlin-Wilmersdorf, Germany;
vested in the Alien Property Custodian Application August 16, 1938, Serial No. 225,253
In Germany August 18, 1937

13 Claims. (Cl. 74—189.5)

In the transmission shown in U. S. Patent No. 2,055,895 there are provided between the pump connected to the drive shaft and the turbine connected to the output shaft, auxiliary driven blade wheels which actuate the output shaft through reduction gears and over-running couplings as long as they rotate slower than the pump. The velocity ratios of the reduction gears are so chosen that the auxiliary driven blade wheels rotate more rapidly than the turbine. As soon as the auxiliary driven wheels attain the revolutionary speed of the pump, the drive action on them disappears, and the power transmission takes place only to the turbine, while the auxiliary driven wheels rotate freely with the speed of rotation of the pump.

Since in this arrangement the velocity ratio between the most rapidly rotating wheel nearest the pump, and the turbine, can be chosen as large as desired, very good starting torques can be obtained with this transmission. In operation the blade wheel nearest the pump extracts from the liquid the entire kinetic energy so that the other blade wheels including the turbine wheel are not driven. On the other hand, the output torque and the efficiency at intermediate output revolutionary speeds of about 0.2 to 0.8 times the driving revolutionary speed, are quite unsatisfactory. The reason for this is that the low output revolutions relatively to the drive revolutions cause the driven blade wheels in the average to rotate too slowly to take up a sufficient amount of power. A further disadvantage of this transmission is that the output revolutions with constant primary revolutionary speed in practice cannot be increased above the speed for the best efficiency. Thus when the transmission is used in a vehicle, an increase of the initial speed upon diminishing resistance (going down grade or with a following wind) above the vehicle speed with no wind and level road, is impossible without increasing the motor speed. The transmission, when the auxiliary driven blade wheels no longer exert driving action, is identical to a coupling. The invention of the present application overcomes these disadvantages because:

1. The blades of the auxiliary driven wheels or turbines arranged in front of the main turbine wheel in the direction of fluid flow, and the blades of the main turbine wheel itself are so designed with relation to each other, that the main turbine, even at non-rotation, develops a substantial output torque. To this end the main turbine blades at the outlet are directed rearwardly. The aforementioned auxiliary turbines have, however, only blades arranged ahead of the main turbine inlet, contrary to the prior transmission in which the same wheels also have blades arranged in the path of the main turbine discharge.

2. A fixed guide device is arranged immediately in font of the pump in the direction of fluid flow, so that on cessation of power transmission by the overrunning couplings, the transmission is identical to an ordinary torque changer which permits a substantial increase of the output revolutions above the speed giving maximum efficiency.

Furthermore additional features as follows are present:

3. The provision of an auxiliary backwardly rotating turbine in the path of the main turbine discharge, which catches at lower turbine speeds rearwardly directed discharge fluid flow of the main turbine and supplies it with a smaller rearward component to the guide device. Thereby impact losses at the guide device are avoided and a rearwardly directed torque is available at the shaft of the auxiliary turbine. If this is to be transmitted to the output shaft then a reverse gear has to be provided between the output shaft and the auxiliary turbine. Exactly as in the case of the auxiliary turbines arranged ahead of the main turbine inlet, an overrunning coupling is provided which prevents transmission of opposing torque.

4. The provision of an auxiliary forward running turbine in the path of the main turbine discharge which catches the forwardly directed flow occurring at excessive turbine speeds, and supplies it with reduced forward directed component to the guide device. Thereby shock losses in the guide device are avoided and the forwardly directed torque is available at the shaft of the auxiliary turbine. If this is to be transmitted to the output shaft then a speed-up gear must be provided between the auxiliary turbine and the output shaft, this gear being such that said auxiliary turbine shall rotate in the same direction but at slower speed than the main turbine. Exactly as in the case of the auxiliary turbines arranged ahead of the main turbine inlet, an overrunning coupling is provided to prevent the occurrence of retarding torques.

The direction of flow in the main turbine discharge, with constant speed of rotation of the pump, is dependent upon the main turbine speed and in ordinary torque changers, at such main turbine speeds as are associated with the maximum efficiency, it becomes almost purely meridional, that is, without peripheral components. At smaller turbine speeds it receives a rearwardly directed component, and at greater turbine speeds a forwardly directed one. This is the cause of the different directions of rotation of the auxiliary turbines arranged in the path of the main turbine discharge, at different turbine speeds.

The auxiliary turbines arranged in the path of the main turbine discharge as well as those arranged ahead of the main turbine inlet can transmit their torque not only to the turbine shaft but to any other driven shafts. The only condition is that such shafts can accept the existing directions of rotation, viz. backwards when they are to deliver power at low, and forward when at high, turbine speeds.

When an auxiliary turbine arranged in the path of the main turbine discharge, and which can rotate in different directions with different revolutionary speeds of the main turbine, according to the above explanations, drives a machine which does not require a definite direction of rotation, then of course the overrunning coupling can be omitted.

Two examples of the present invention are illustrated in Figs. 1–10, of which Fig. 1 is a longitudinal section of the fluid circuit comprising the various bladed wheels and of the gears providing the connection of the driven wheels or turbines to the driven shafts, in this case (a) a drive off shaft leading, for instance, to the driving wheels of a vehicle and (b) the shaft of a machine as an electric generator, an air pump or the like; Figs. 2, 3 and 4 are cross-sections taken on the lines A—A, B—B and C—C of Fig. 1, showing the overrunning clutches and the different directions of rotation; Fig. 5 is a longitudinal section showing the provision of an overrunning clutch between an auxiliary turbine and an auxiliary driven machine. Figs. 6 and 7 are cross-sections on line D—D of Fig. 5 representing two alternative arrangements of said overrunning clutch. Fig. 8 is a longitudinal section of the parts forming the fluid circuit and a plan view of the gears providing the connection of the driven wheels or turbines inside the fluid circuit to the driven shafts, in this case a main driving axle and a temporary driving axle of a railway vehicle. Figs. 9 and 10 are cross-sections along lines E—E and F—F respectively and show the overrunning clutches and the different directions of rotation.

In Fig. 1, 1 is the driving shaft to which is connected the driving wheel or pump 2. 3 is the main driven wheel or main turbine. By means of the hollow shaft 4 the main turbine 3 is connected to the gearwheel 5 which meshes with gearwheel 6 mounted on the driven shaft 7. 8 is a stationary guide wheel fixed to the stationary hollow shaft 9. 10 is an auxiliary driven wheel or turbine driving, by means of shaft 11, the inner part of an overrunning clutch 12, the outer part of which is fixed to the gearwheel 13 which meshes with the gearwheel 14 forming a part of the driven shaft 7. The diameters of the gearwheels 5, 6, 13, 14 are chosen in such a way, that gearwheel 13 will revolve faster than the main turbine. The locking direction of the overrunning clutch 12 is such that the auxiliary turbine 10 will not rotate faster than gearwheel 13, the torque being transmitted into the driven shaft if the auxiliary turbine should attempt to do so.

15 is an auxiliary driven wheel or turbine being mounted on a rotatable hollow shaft 16, the latter being connected to the inner parts of two overrunning clutches 17, 21 of opposed locking direction. The outer part of the clutch 17 is connected to gearwheel 18 geared to gearwheel 19 on the driven shaft 7 by means of the intermediary gear wheel 20, the outer part of the clutch 21 being fixed to gearwheel 22, the latter meshing with gearwheel 23 also forming a part of the driven shaft 7. Thus gearwheel 18 will revolve in the opposite direction to the main turbine 3, whereas gearwheel 22 will revolve in the same direction. The diameters of the wheels 5, 6, 22, 23 are chosen in such a way, that gear wheel 22 will rotate slower than the main turbine. Thus auxiliary turbine 15 will drive the driven shaft 7 through overrunning clutch 17 and gears 18, 19 and 20, when the auxiliary turbine 15 rotates backward relative to the main turbine 3, at a speed equal to the speed of rotation of gearwheel 18; similarly auxiliary turbine 15 will drive shaft 7 through overrunning clutch 21 and gears 22 and 23, when auxiliary turbine 15 rotates in the same direction as the main turbine 3 at a speed equal to the speed of gearwheel 22. 24 is a further auxiliary driven wheel or turbine mounted on the hollow shaft 25 and by means of said shaft it is connected to gearwheel 26, the latter driving a machine 27 by means of gearwheel 28, on the driving shaft of said machine. Said machine 27, for instance an electric generator, an air pump or the like, is adapted to be driven in either direction, that is it will deliver electric current or compressed air regardless of the direction of rotation of auxiliary turbine 24.

According to the layout of the blades of the pump, the main turbine and the guide wheels there is a certain speed ratio between the pump and the main turbine at which no eddy losses will occur and accordingly the efficiency will reach a maximum. The blades of the auxiliary turbines are such that at this speed ratio they will be idling, none of the overrunning clutches being locked and auxiliary turbine 24 practically standing still. Assuming the speed of the pump being kept constant and the speed of the main turbine being decreased, the direction of the flow will not change in the discharge of the pump, but it will take up a backward circumferential component in the discharge of the main turbine, the direction of such discharge flow at highest efficiency speed ratio being almost meridian and all the more, the more the speed of the main turbine is decreased.

Thus the auxiliary turbine 10 will keep up its original idling speed until forced to rotate slower by the overrunning clutch 12 and in unison with the gearwheel 13, whereas auxiliary turbine 15 will rotate backwardly with increasing speed until it is forced to rotate slower again and in unison with gearwheel 18 by the overrunning clutch 17, both auxiliary turbines 10 and 15 thus transmitting torque into the driven shaft.

Similarly when the speed of the main turbine is raised above that of its highest efficiency, auxiliary turbine 10 will continue to idle at the same speed, whereas auxiliary turbine 15 will begin to rotate in a forward direction in consequence of the discharge flow of the main turbine assuming that direction, until it revolves as fast as gearwheel 22. Then the overrunning clutch 21 will lock and if the speed of the main turbine is raised further the auxiliary turbine 15 will add driving torque to the driven shaft.

As already mentioned the direction of the flow at the intake of the guide wheel is essentially meridian at maximum efficiency and the intake angles of the guide wheel blades are such that no eddy-losses will occur if the flow has that direction. If the main turbine speed is reduced from that giving maximum efficiency and auxiliary turbine 15 is still idling due to the relative speed of the sleeve 16 and gearwheel 18, then the flow at the intake of the guide wheel will take on a backward direction, thereby causing eddy losses at the intake edges of the guide wheel if the auxiliary turbine 24 did not make use of the forward component by driving machine 27 and thus adjusting the direction of flow to the meridian. If the speed of the main turbine decreases still further, for instance to absolute standstill, then the overrunning clutch 17 will be locked and auxiliary turbine 15 will transmit torque into the driven shaft by means of gears 18, 19 and 20. In order to attain a strong effect as regards the torque of the auxiliary turbine it will be found useful to have the flow which is discharged from the auxiliary turbine 15 provided with a forward circumferential component, so that eddy losses would occur at the intake of the guide wheel if auxiliary turbine 24 did not make use of said forward component by driving machine 27 and thus adjusting the direction of flow to the meridian.

Thus auxiliary turbine 24 in combination with machine 27 will have a useful effect regardless of the direction of flow at the intake of said wheel. Naturally it does not make any difference whether the direction of flow is due to the main turbine or to the auxiliary turbine 15. Therefore auxiliary turbine 24 may be provided if auxiliary turbine 15 is not provided at all or for instance is operative only if the main turbine speed is raised or decreased from that giving maximum efficiency. On the other hand the effect of the auxiliary turbine 15 alone without auxiliary turbine 24 is very satisfactory, so that if there is no desire to drive one of the mentioned machines, auxiliary turbine 24 and the parts connected thereto can be dispensed with.

In Figs. 2, 3, 4, 6, 7, 9, 10, the arrows indicate the directions of rotation of the elements. Overrunning clutches 17 and 21 will lock in opposite direction, while clutches 12 and 21 lock in the same direction.

In Figs. 5, 6 and 7 1 is the shaft driving the pump, 8 is the guide wheel fixed to the stationary hollow shaft 9. 15 is the shell of an auxiliary turbine acting onto a main drive-off shaft as in Fig. 1. 24 is an auxiliary turbine rigidly connected by means of the hollow shaft 25 to the inner part of the overrunning clutch 29. The outer part of the overrunning clutch 29 is formed by the gearwheel 26 which meshes with gearwheel 28 on the driving shaft of machine 27.

According to the desired direction of drive the overrunning clutch 29 will have to be designed either in accordance with Fig. 6, if auxiliary turbine 24 is expected to supply power when running backward relative to the pump, or in accordance with Fig. 7, if auxiliary turbine 24 is expected to supply power when running in the same direction as the pump.

In Figs. 8, 9 and 10 1 is the primary shaft driving the pump 30. 31 is the guide wheel kept stationary by the stationary hollow shaft 32. 33 is the main turbine of which the inlet is constricted in order to reduce the angle between the relative intake velocity and the meridian direction and which by means of gearwheels 34, 35 drives the main drive-off shaft 36 and thus by means of the conical gears 37 the main driving axle 38 of a railway vehicle. 39 and 40 are auxiliary turbines acting onto the temporary driving axle 46. The hollow shafts 51, 52 connect said auxiliary turbines to the inner parts of two overrunning clutches 41, 47. Auxiliary turbine 39 is adapted to extract power at turbine speeds above that giving maximum efficiency and as soon as it turns as fast as gearwheel 42 overrunning clutch 41 will lock and thus transmit the output of auxiliary turbine 39 by means of gearwheels 42, 43 onto the temporary drive-off shaft 44 and from there onto the temporary driving axle 46 by the conical gears 45. Auxiliary turbine 40 is adapted to extract power at turbine speeds below that giving maximum efficiency and as soon as it turns as slow as gearwheel 48 overrunning clutch 47 will lock and thus transmit the power of auxiliary turbine 40 by means of gearwheels 49, 48 and 50 onto the temporary drive-off shaft 44 and from there onto the temporary driving axle 46 by conical gears 45.

The rotation of the gearwheels 42, 48 results from the connection of these gearwheels to the main drive-off shaft 36 caused by conical gears 37, 45, the driving axles 38, 46 and the rails connecting the two driving axles thus giving them a proportional speed of rotation. Gearwheel 48 rotates backward relative to the main turbine 33 whereas gearwheel 42 rotates in the same direction as the main turbine, but at smaller speed.

I claim:

1. Fluid torque converter drive comprising a rotatably mounted primary driving part, output means, a main secondary driven part also rotatably mounted and arranged coaxially with, and in the path of, the discharge of said primary driving path and coupled to said output means, rotatably mounted auxiliary driven parts arranged coaxially with said secondary driven part, overrunning clutches between said auxiliary driven parts and said output means, a stationary guide part arranged in front of the primary driving part in the direction of fluid flow, and means for so connecting said auxiliary driven parts to said output means that said auxiliary driven parts will revolve in relation to said secondary driven part, so that said auxiliary driven parts may be also adapted to impose substantial torque on the output means and may be disengaged from said latter as soon as their driving power ceases.

2. Fluid torque converter drive comprising an output shaft, a primary driving part in the form of a rotary pump, a secondary driven part in the form of a main turbine having its rotary blade wheel arranged coaxially with said driving part in the path of its discharge flow and coupled to said output shaft, an auxiliary turbine arranged coaxially with and ahead of the inlet of said main turbine, at least one auxiliary turbine arranged coaxially with and in the path of, the discharge flow of said main turbine, a stationary guide wheel arranged between said lastly mentioned auxiliary turbine and said rotary pump in the direction of fluid flow, overrunning clutches between said auxiliary turbines and said output shaft, and means for connecting said auxiliary turbines to said output shaft so that said auxiliary turbines will revolve in relation to said main turbine, so that said auxiliary turbines are also adapted to impose substantial torque on the output shaft and will be disengaged from the latter as soon as their driving power ceases.

3. Fluid torque converter drive comprising an output shaft, a primary driving part in the form of a rotary pump, a secondary driven part representing a main turbine having its rotary blade wheel arranged coaxially with said driving part in the path of its discharge flow and coupled to said output shaft, an auxiliary turbine arranged coaxially with and ahead of the inlet of said main turbine and revolving at higher speed than said main turbine, at least one auxiliary turbine arranged coaxially with, and in the path of, the discharge flow of said main turbine and revolving slower than said main turbine, a stationary guide wheel arranged between said last mentioned auxiliary turbine and said rotary pump in the direction of the fluid flow, overrunning clutches between said auxiliary turbines and said output shaft, and means for connecting said auxiliary turbines to said output shaft so that said auxiliary turbines are also adapted to impose substantial torque on the output shaft and will be disengaged from the latter as soon as their driving power ceases.

4. Fluid torque converter drive comprising an output shaft, a primary driving part representing a rotary pump, a secondary driven part representing a main turbine having its rotary blade wheel arranged coaxially with said driving part in the path of its discharge flow and coupled to said output shaft, auxiliary turbines arranged coaxially with, and in the path of, the discharge flow of said main turbine, a stationary guide wheel arranged between said auxiliary turbines and said rotary pump in the direction of the fluid flow, an overrunning clutch between each of said auxiliary turbines and said output shaft, and means for connecting said auxiliary turbines to said output shaft so that said auxiliary turbines will revolve in opposite direction to said main turbine, so that said auxiliary turbines are also adapted to impose substantial torque on the output shaft and will be disengaged from the latter as soon as their driving power ceases.

5. Fluid torque converter drive according to claim 1, in which an auxiliary turbine is arranged behind a stage of the main turbine part and in which overrunning clutches and a reduction gear are provided wherein the auxiliary turbine transmits its torque at speed ratios corresponding to secondary speeds above that giving maximum efficiency by means of the overrunning clutches and the reduction gear.

6. Fluid torque converter drive according to claim 1, in which an auxiliary turbine is arranged behind a stage of the main turbine and in which overrunning clutches and a reduction gear are provided wherein the auxiliary turbine transmits its torque at speed ratios corresponding to secondary speeds above that giving maximum efficiency by means of the overrunning clutches and the reduction gear, and in combination with at least one auxiliary turbine being arranged between the main turbine and the guide wheel and adapted to extract power at secondary speeds below that giving maximum efficiency, there being provided means for so connecting said auxiliary turbines to the output shaft that the said auxiliary turbines will revolve in opposite direction to the main turbine, and an overrunning clutch so arranged between said auxiliary turbines and the output shaft that said auxiliary turbines will be disengaged from the output shaft as soon as its driving power ceases.

7. Fluid torque converter drive according to claim 1, in which an auxiliary turbine, an overrunning clutch, another overrunning clutch of opposite locking direction, a drive-off shaft and a reversing gear are provided, the auxiliary turbine being arranged behind a stage of the main turbine, said auxiliary turbine carrying blades and transmitting its torque at starting and at speed ratios corresponding to secondary speeds below that giving maximum efficiency by means of the overrunning clutch and the reversing gear, at speed ratios corresponding to secondary speeds above that giving maximum efficiency by means of the overrunning clutch of opposed locking direction, and in which a reduction gear is provided on the drive-off shaft rotating in proportion to the main turbine.

8. Fluid torque converter drive according to claim 1, in which an overrunning clutch and an auxiliary turbine are provided, said auxiliary turbine being arranged behind a stage of the main turbine and transmitting its torque at starting and at speed ratios corresponding to secondary speeds below that giving maximum efficiency by means of the overrunning clutch onto auxiliary machines that otherwise would have to be driven directly from an outside source.

9. Fluid torque converter drive according to claim 1, in which an auxiliary turbine is provided which is arranged behind a stage of the main turbine, the idling speed of said auxiliary turbine being zero at speed ratios close to that giving maximum efficiency and being coupled in both directions with an auxiliary machine adapted to be driven in either direction and having otherwise to be driven directly from an outside source.

10. Fluid torque converter drive according to claim 1, in which an auxiliary turbine is provided which is arranged behind a stage of the main turbine, said auxiliary turbine distributing and diminishing eddy losses and extracting additional power, the width of the circuit at the intake of said stage of the main turbine being narrowed in order to secure high meridian velocities of flow.

11. Fluid torque converter drive comprising a rotatably mounted primary driving part, output means, a main secondary driven part also rotatably mounted and arranged coaxially with, and in the path of, the discharge of, said primary driving part and coupled to said output means, at least one rotatably mounted auxiliary driven part arranged coaxially with said secondary driven part, a stationary guide part arranged in front of the primary driving part in the direction of fluid flow, and means for connecting said auxiliary driven part to said output means so that said auxiliary driven part will either drive said output means and will revolve in relation to said secondary driven part, or idle as soon as the driving power ceases.

12. Fluid torque converter drive comprising a rotatably mounted primary driving part, a main secondary driven part also rotatably mounted and arranged coaxially with, and in the path of the discharge of, said primary driving part and coupled to output means, rotatably mounted auxiliary driven parts arranged coaxially with said main secondary driven part, a stationary guide part in front of the primary driving part in the direction of fluid flow, one of the auxiliary driven parts being arranged ahead of the inlet of said main secondary driven part, means for connecting said auxiliary driven part to said output means, so that said auxiliary driven part will revolve in the same direction but at higher speed than the main secondary driven part, and an overrunning clutch between said auxiliary driven parts and said output means to disengage said auxiliary driven parts from said output means as soon as its driving power ceases, the blade arrangement of the main turbine and of said auxiliary turbines being such that each of them will impose substantial torque onto said output means, when the latter are kept stationary.

13. Fluid torque converter drive comprising a rotatably mounted primary driving pump, a main turbine rotatably mounted and arranged coaxially with, and in the path of the discharge of, said primary driving pump and coupled to output means, rotatably mounted auxiliary driven turbines arranged coaxially with said main turbine, a stationary guide part in front of the primary driving pump in the direction of fluid flow, and an overrunning clutch, one of said auxiliary turbines being arranged in the path of the discharge flow of said main turbine and transmitting its torque at main turbine speeds above that giving maximum efficiency by means of said overrunning clutch onto auxiliary machines.

VICTOR SPEISER.